US010648058B1

(12) United States Patent
Phillips

(10) Patent No.: US 10,648,058 B1
(45) Date of Patent: May 12, 2020

(54) SYSTEMS AND METHODS FOR LOW TEMPERATURE METAL PRINTING

(71) Applicant: The United States of America, as represented by the Secretary of the Navy, Arlington, VA (US)

(72) Inventor: Jonathan Phillips, Pacific Grove, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/928,459

(22) Filed: Mar. 22, 2018

Related U.S. Application Data

(63) Continuation-in-part of application No. 15/251,035, filed on Aug. 30, 2016, now Pat. No. 10,273,582, and
(Continued)

(51) Int. Cl.
*C22B 5/12* (2006.01)
*B33Y 10/00* (2015.01)
(Continued)

(52) U.S. Cl.
CPC .............. *C22B 5/12* (2013.01); *B22F 3/008* (2013.01); *B33Y 10/00* (2014.12); *B33Y 30/00* (2014.12);
(Continued)

(58) Field of Classification Search
CPC ... B29C 64/153; B29C 64/165; B29C 64/188; C22B 5/10; C22B 5/12; B33Y 10/00; B33Y 30/00; B33Y 50/02; B22F 3/008
(Continued)

(56) References Cited

U.S. PATENT DOCUMENTS 8,709,126 B1 * 4/2014 Luhrs ..................... B22F 1/02
75/351
8,894,886 B1 11/2014 Luhrs et al.
(Continued)

OTHER PUBLICATIONS

Wang et al., "A general approach for fabrication of nitrogen-doped graphene sheets and its application in supercapacitors," Journal of Colloid and Interface Science 417 (2014).
(Continued)

*Primary Examiner* — Joseph S Del Sole
*Assistant Examiner* — Lawrence D. Hohenbrink, Jr.
(74) *Attorney, Agent, or Firm* — Naval Postgraduate School; Scott Bell

(57) ABSTRACT

A system and method of providing metal comprising objects via additive manufacturing techniques using an RES mixture. The RES process mixes a precursor compound and a chemical agent which thermally decomposes to form typically CO, $H_2$, $NH_x$, or some other reducing agent. Using the RES mixture, the additive manufacturing device reproduces an object from a sliced object model file layer-by-layer. Heat is applied to the patterned RES mixture to thermally decompose the chemical agent and reduce the precursor compound to a reduced metal species. This heating and reduction transforms the RES mixture from a general paste having little to no shear strength to an solid form exhibiting a much greater shear strength, allowing layer-by-layer generation of 3D object components.

7 Claims, 3 Drawing Sheets

Related U.S. Application Data a continuation-in-part of application No. 15/625,103, filed on Jun. 16, 2017.

(60) Provisional application No. 62/541,364, filed on Aug. 4, 2017, provisional application No. 62/370,066, filed on Aug. 2, 2016, provisional application No. 62/407,787, filed on Oct. 13, 2016.

(51) Int. Cl.
| | |
|---|---|
| *B22F 3/00* | (2006.01) |
| *B33Y 50/02* | (2015.01) |
| *B33Y 30/00* | (2015.01) |
| *B29C 64/165* | (2017.01) |
| *B29C 64/188* | (2017.01) |
| *C22B 5/10* | (2006.01) |
| *B29C 64/153* | (2017.01) |

(52) U.S. Cl.
CPC .......... *B33Y 50/02* (2014.12); *B29C 64/153* (2017.08); *B29C 64/165* (2017.08); *B29C 64/188* (2017.08); *C22B 5/10* (2013.01)

(58) Field of Classification Search
USPC .......................................................... 425/375
See application file for complete search history.

(56) References Cited

U.S. PATENT DOCUMENTS

| | | | |
|---|---|---|---|
| 9,308,585 B2 | 4/2016 | Leseman et al. | |
| 2005/0250863 A1 | 11/2005 | Green et al. | |
| 2007/0209480 A1* | 9/2007 | Eisele | ................. C21B 13/0006 75/560 |
| 2017/0297097 A1* | 10/2017 | Gibson | ................. B33Y 30/00 |

OTHER PUBLICATIONS

Hassoun et al., "A Nanostructured Sn—C Composite Lithium Battery Electrode with Unique Stability and High Electrochemical Performance," Adv. Mater. 20 (2008).
Teng et al., "Activation Energy for Oxygen Chemisorption on Carbon at Low Temperatures," Ind. Eng. Chem. Res. 38 (1999).
Dastgheib et al., "Adsorption of oxygen by heat-treated granular and fibrous activated carbons," Journal of Colloid and Interface Science 274 (2004).
Phillips et al., "Calorimetric study of oxygen adsorption on activated carbon," Themiochimica Acta 312 (1998).
Chen et al., "Effect of Support Pretreatments on Carbon-Supported Fe Particles," J. Phys. Chem. 91 (1987).
Tian et al., "High capacity group-IV elements (Si, Ge, Sn) based anodes for lithium-ion batteries," Journal of Materiomics 1 (2015).
Mercier et aL, "Influence of the C/Sn Ratio on the Synthesis and Lithium Electrochemical Insertion of Tin-Supported Graphite Materials Used as Anodes for Li-Ion Batteries," International Journal of Electrochemistry, vol. 2011, Article ID 381960, doi:10.4061/2011/381960 (2011).
Floess et al., "Kinetics of Oxygen Chemisorption on Microporous Carbons," Energy &Fuels 5 (1991).
Park et al.,"Li-alloy based anode materials for Li secondary batteries," Chem. Soc. Rev. 39 (2010).
Chen et al.,"Searching for electrode materials with high electrochemical reactivity," Journal of Materiomics 1 (2015).
Lee et al.,"Synthesis of Tin-Encapsulated Spherical Hollow Carbon for Anode Material in Lithium Secondary Batteries," J. Am. Chem. Soc. 125 (2003).
Luhrs et al., "Novel Process for Solid State Reduction of Metal Oxides and Hydroxides,"Metallurgical and Materials Transactions B, Feb. 2013, vol. 44B, Issue 1 (2013) 44: 115-122.
Zea et al., "Modified reductive expansion synthesis (M-RES) for the production of carbon porous material from deteriorated banknotes," International Journal of ChemTech Research 8(3) (2015).
Zea et al., "Reductive/expansion synthesis of zero valent submicron and nanometal particles," J. Mater. Res. 26(5) (2011).
Lowell, Samuel L., Reduction Expansion Synthesis for Magnetic Alloy Powders, Thesis, Naval Postgraduate School, 2015.
Soliman et al.,"Aerosol Synthesis of Nano and Micro-scale Zero Valent Nickel Particles from Oxide Precursors," Proceedings of the ASME 2010 International Mechanical Engineering Congress & Exposition, IMECE2010, Nov. 12-18, 2010, Vancouver, British Columbia, Canada.
Soliman et al.,"Aerosol Synthesis of Nano and Micro-scale Zero Valent Metal Particles from Oxide Precursors," LA-UR-10-04206, available at http://permalink.lanl.gov/object/tr?what=info:lanl-repo/lareport/LA-UR-10-04206, last accessed Aug. 10, 2016.
Canty et al., "Reduction Expansion Synthesis as Strategy to Control Nitrogen Doping Level and Surface Area in Graphene," Materials 8 (2015).
Greenaway, Karima A., "A Novel Nonelectrolytic Process for Chromium and Nickel Coating," Naval Postgraduate School Thesis, Jun. 2015.
Ahmed, Hesham M., et al, "Kinetics of Reduction of NiO-WO3 Mixtures by Hydrogen", Metallurgical and Materials Transactions B, vol. 41B, Feb. 2010, pp. 161-172.
Winter et al., "Electrochemical lithiation of tin and tin-based intermetallics and composites," Electrochimica Acta 45 (1999).
Courtney et al., "Electrochemical and In Situ X-Ray Diffraction Studies of the Reaction of Uthium with Tin Oxide Composites," J. Electrochem. Soc. 144 (1997).
Zhang et al., "Tin-Nanoparticles Encapsulated in Elastic Hollow Carbon Spheres for High-Performance Anode Material in Lithium-Ion Batteries," Adv. Mater. 20 (2008).
Menendez et al., "On the Modification and Characterization of Chemical Surface Properties of Activated Carbon: In the Search of Carbons with Stable Basic Properties," Langmuir 12 (1996).
Phillips et al., "Microcalorimetric Study of the Influence of Surface Chemistry on the Adsorption of Water by High Surface Area Carbons," J. Phys. Chem. B 104 (2000).
Phillips et al., "Iron Pentacarbonyl Decomposition over Grafoil. Production of Small Metallic Iron Particles," J. Phys. Chem. 84 (1980).
Baker et al., "Filamentous Carbon Formation Over Iron Surfaces," ACS Symp. Ser. 202 (1982).
Hegenberger et al., "Evidence of Strong Interaction between Iron Particles and an Activated Carbon Support," J. Phys. Chem. 91 (1987).
Tessmer et al., "Impact of Oxygen-Containing Surface Functional Groups on Activateed Carbon Absorption of Phenols," Environ. Sci. Technol. 31 (1997).
Boehm, "Surface oxides on carbon and their analysis: a critical assessment," Carbon 40 (2002).
Lázaro et al, Study and Application of Carbon Black Vulcan XC-72R in Polymeric Electrolyte Fuel Cells, in Carbon Black: Production, Properties and Uses (2011).

\* cited by examiner

SYSTEMS AND METHODS FOR LOW TEMPERATURE METAL PRINTING

RELATION TO OTHER APPLICATIONS

This patent application is a nonprovisional of and claims benefit from U.S. Provisional application 62/541,364 filed Aug. 4, 2017, and further is a continuation-in-part of U.S. Nonprovisional application Ser. No. 15/251,035 filed Aug. 30, 2016, which claimed benefit from U.S. Provisional 62/370,066 filed Aug. 2, 2016, and further is a continuation-in-part of U.S. Nonprovisional application Ser. No. 15/625,103 filed Jun. 16, 2017, which claimed benefit from U.S. Provisional 62/407,787 filed Oct. 13, 2016, all of which are hereby incorporated by reference in their entirety.

FIELD OF THE INVENTION

One or more embodiments relates generally to a system and method for additive manufacturing using a Reduction-Expansion-Synthesis (RES) mixture comprising a reducing chemical agent and a metal precursor material.

BACKGROUND 3D printing, also known as additive manufacturing (AM), generally creates a three-dimensional object by forming layers of material under computer control. Objects are produced using digital model data from a 3D model or another electronic data source such as an Additive Manufacturing File (AMF) file. Before printing a 3D model, it is generally examined for errors and processed by slicing software which converts the model into a series of thin layers and produces a code file containing instructions tailored to a specific type of 3D printer, with the 3D printer subsequently constructing a replica of the model in a layer by layer fashion. Polymers, resins and other curing and setting materials are often utilized in typical 3D printing processes.

Additive manufacturing of metal comprising objects generally involves specific steps and processes for sintering and fusion of the base material once deposited. In some applications, laser sintering techniques deposit discrete metal-comprising material and the deposits are sintered through heating with the laser. Other applications such as selective laser melting do not use sintering but rather completely melt a powder using a high-energy laser to create fully dense materials in a layer-wise method. Electron beam melting is a similar type of additive manufacturing technology for metal parts which manufactures parts by melting metal powder layer by layer with an electron beam in a high vacuum. These methods require generation of high local temperatures and further are fundamentally limited to a precision of the order of the size of the metal particles employed, generally about 20 micron.

It would be advantageous to provide a system and method which could be significantly lower that the melting temperatures of the underlying metal material. It would be additionally advantageous to provide a system and method offering precisions below the 20 micron limit of typical processes.

These and other objects, aspects, and advantages of the present disclosure will become better understood with reference to the accompanying description and claims.

SUMMARY

The disclosed system and method provides for generation of metal comprising objects via additive manufacturing techniques using a mixture comprising a precursor compound and a chemical agent which thermally decomposes to form typically CO, $H_2$, $NH_x$, or some other reducing agent. A Reduction-Expansion-Synthesis (RES) mixture is used by an additive manufacturing device to reproduce an object from a sliced object model file layer-by-layer. Heat is applied to the patterned RES mixture either between formation of each layer or following formation of all layers in the object model file. The heating thermally decomposes the chemical agent producing the reducing agent, and contact between the reducing agent and the precursor compound reduces the precursor compound to a reduced metal species. This heating and reduction transforms the RES mixture from a general paste having little to no shear strength to an solid form exhibiting a significant shear strength, allowing layer-by-layer generation of 3D object components.

In certain embodiments, the disclosure provides a system comprising a an additive manufacturing device having a printing bed and a nozzle, one or more motors mechanically configured to displace the printing bed and the nozzle, a reservoir in fluid communication with the nozzle with the reservoir holding an RES mixture, a heating apparatus, and a system processor programmed to generate an object in accordance with the method disclosed.

The novel apparatus and principles of operation are further discussed in the following description.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a system and method for additive manufacturing using a mixture comprising a reducing chemical agent and a metal precursor material.

The disclosure provided herein provides for a system and method of providing metal comprising objects via additive manufacturing techniques using a mixture which, following deposition, undergoes a process termed Reduction-Expansion-Synthesis (RES). The RES process mixes a precursor compound and a chemical agent which thermally decomposes to form typically CO, $H_2$, $NH_x$, CxHy, CxHyOz or some other reducing agent. Within this disclosure, an RES mixture is used by an additive manufacturing device to reproduce an object from a sliced object model file layer-by-layer. Heat is applied to the patterned RES mixture either between formation of each layer or following formation of all layers in the object model file. The heating thermally decomposes the chemical agent producing the reducing agent, and contact between the reducing agent and the precursor compound reduces the precursor compound to a reduced metal species. This heating and reduction transforms objects comprising the RES mixture from a general paste having little to no shear strength to an solid form exhibiting a significant shear strength, allowing layer-by-layer generation of 3D components.

The disclosed process thereby provides a means through which metal parts may be manufactured using devices intended for the manufacture of, for example, plastic parts. In certain embodiments, the RES is utilized to reduce metal oxide precursors to zero valent metal structures in the sub-micron primary crystal size range. As a result, the process can be carried out using relatively simple and inexpensive 3D manufacturing equipment in conjunction with some low temperature heating apparatus in order to create objects with feature sizes of the order of 1 micron. In contrast, current metal printing methods generally employ an e-beam or a precision high power laser, and are additionally and fundamentally limited to a precision of the order of the size of the metal particles employed, generally about 20 microns. Further, the disclosed process is typically conducted at a temperature many hundreds of degrees lower than that currently required for metal 3D printing. For example, creation of an iron part using current 3D manufacturing technology generally requires heating the metal in the pattern to the melting temperature of iron, >1500 C. In contrast, in some embodiments, the method disclosed yields complete iron reduction and some sintering at <800 C.

Figure 1:
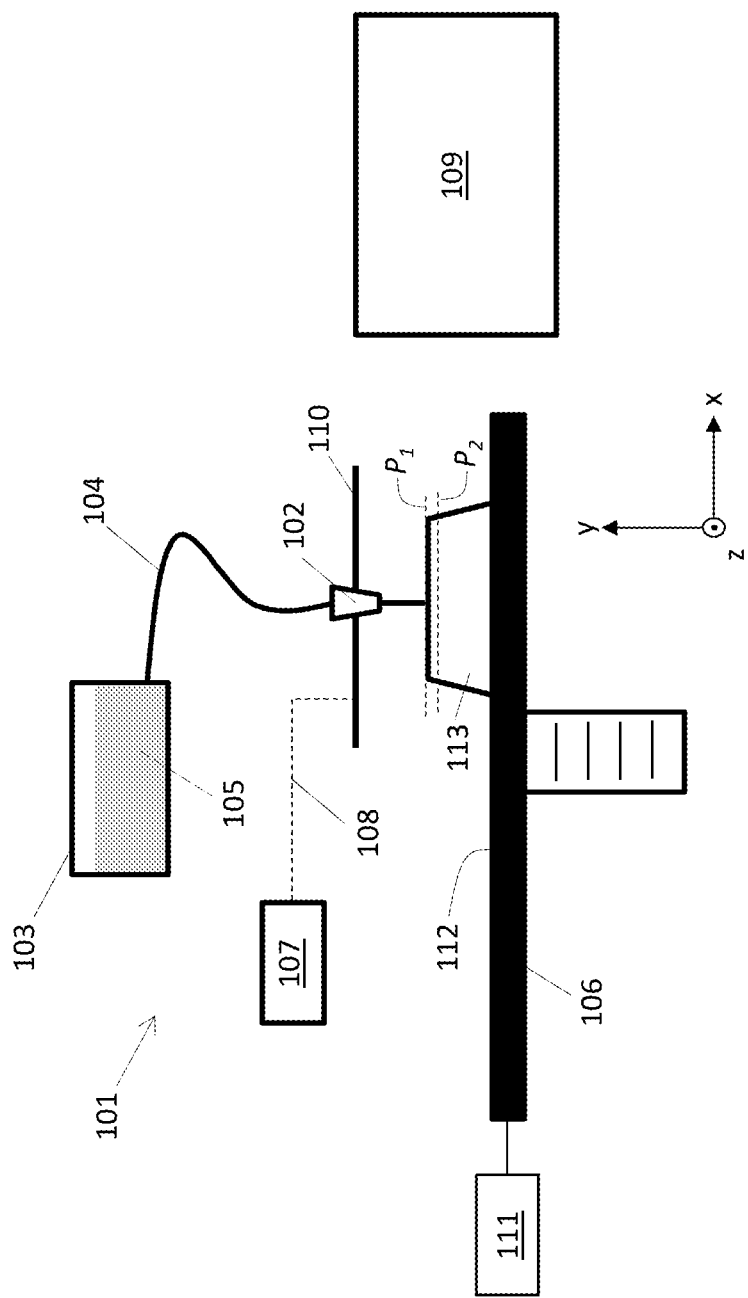
FIG. 1 illustrates an embodiment of the system.

FIG. 1 illustrates a general process for conducting the disclosed method illustrating an additive manufacturing device 101 comprising nozzle 102 and nozzle support 110, RES reservoir 103, conduit 104, digital processor 107, and printing bed 112 on platform 106. Digital processor 107 is in data communication with one or more of the various components, for example at 108, in order that the relative displacement of nozzle 102 and printing bed 112 may be altered in a manner prescribed by an object model file accessed by digital processor 107, as is known in the art. Typically nozzle support 110 and platform 106 have a combined movement capability such that digital processor 107 may direct relative movement between nozzle 102 and platform 106 in directions parallel to each of the x-y-z axes illustrated.

The object model file held or accessed by digital processor 107 includes data comprising a plurality of individual layer data, where each individual layer data one of a plurality of slices of some object such as object 113. Additive manufacturing device 101 generates a 3D representation of the item described by the object model file in a layer-by-layer manner, by altering the relative displacement of nozzle 102 and printing bed 112 in accordance with a specific and singular individual layer data comprising the plurality of individual layer data while issuing RES mixture 105 from RES reservoir 103 through nozzle 102. For example, at FIG. 1, additive manufacturing device 101 deposits RES mixture through nozzle 102 to form an individual patterned layer of RES mixture between geometric planes $P_1$ and $P_2$, where $P_1$ is substantially parallel to $P_2$, and where the individual patterned layer is described by a specific individual layer data from among the plurality of individual layer data. As is understood, additive manufacturing device 101 executes each specific individual layer data and builds each layer in a highly specified sequence, in order to generate an object such as 113 according to the description of the object model file.

Additive manufacturing device 101 generates one or more individual patterned layers comprising RES mixture in this manner. Following generation of the one or more layers, heat is applied in order generate a metal-comprising solid material. For example, heat may be applied by relocating object 101 to furnace 109 via platform controller 111 at FIG. 1, or heat may be applied by some other means. Heating the one or more RES mixture layers drives the one or more layers to at least the decomposition temperature of the chemical agent comprising the RES mixture and results in generation of a reducing agent. Contact between the reducing agent and the precursor compound reduces the precursor compound to a reduced metallic species. The reduced metallic species generally forms solid aggregates which interlink to comprise a solidified structure, while the other products of the reduction generally comprise gases which evacuate the solidified structure. The heating and subsequent reduction-expansion-synthesis process thereby transforms the constructed object from a series of RES mixture layers having paste-like consistency with little to no shear strength into a solid form of metallic layers exhibiting a significant shear strength.

In certain embodiments, heat is applied and the reducing gases produced following generation of each single patterned layer of RES mixture by the additive manufacturing device, such that object construction occurs through separate and distinct generation of a series of metallic layers. In other embodiments, a plurality of patterned layers of RES mixture is generated by the additive manufacturing device and heat is applied to the entire plurality as a group. Generally the layer of RES mixture is heated through exposure to a heated inert atmosphere. In a certain embodiment, heating of the one or more individual patterned layers and the subsequent reduction reaction occurs in an insert atmosphere comprising an inert gas. In particular embodiments, the inert gas comprises at least 90 volume percent of the heated inert atmosphere. In other embodiments, the inert gas comprises or consists of nitrogen, argon, helium, other noble gases, or mixtures thereof. The decomposition temperature utilized is typically less than a melting temperature of the precursor compound and the metal comprising the precursor compound. In certain embodiments, the decomposition temperature is from about 400° C. to about 1200° C., and in other embodiments, greater than 700° C.

As discussed, the RES mixture generally comprises a mixture of a precursor compound and a chemical agent, where the precursor compound typically comprises a metal oxide, metal hydroxide, metal nitrate, metal carbonyl, metal sulfide, metal chloride, metal halide, or other stable molecular form containing a metal. The chemical agent is a compound that generates a reducing agent such as reducing gases upon thermal decomposition. In some embodiments, the chemical agent comprises stable chemical compounds containing $NH_z$, CO and other groups, and the reducing gases created from the decomposition of these compounds include CO, $H_x$, and/or $NH_x$ and other molecules and radicals, including hydrocarbon radicals with general formula CxHy or CxHyOz, that can subsequently act as reducing agents. In certain embodiments the chemical agents comprise nitrogen-hydrogen (N—H) containing molecules such as urea [$(NH_2)_2CO$], ammonia ($NH_3$), or other compounds containing —$NH_2$ or —NH. The chemical agents can also include those present in nature to generate reducing species upon decomposition.

In particular embodiments, the mixture comprises a weight ratio of the chemical agent to the precursor compound of at least 2. In an embodiment, the precursor compound comprises a metal oxide, and the mixture comprises a weight ratio of the chemical agent to the precursor compound of at least 3. In another embodiment, the mixture comprises a molar ratio of nitrogen-hydrogen (N—H) containing molecules to positive valent metal atoms of at least 3:1. Other additional but not limiting metal precursors and chemical agents suitable for use in this disclosure are as discussed in U.S. application Ser. No. 15/251,035 filed by Phillips, filed Aug. 30, 2016; U.S. Application 62/370,066 filed by Phillips, filed Aug. 2, 2016; Luhrs et al., "Novel Process for Solid State Reduction of Metal Oxides and Hydroxides," Metall and Materi Trans B (2013); Lowell et al., Reduction expansion synthesis for magnetic alloy powders, (masters thesis, Naval Postgraduate School, 2015); Soliman et al., "Aerosol Synthesis of Nano and Micro-scale Zero Valent Nickel Particles from Oxide Precursors," Proceedings of the ASME 2010 International Mechanical Engineering Congress & Exposition, IMECE2010, Nov. 12-18, 2010, Vancouver, British Columbia, Canada; U.S. Pat. No. 8,709,126 issued to Luhrs et al., issued 2014 Apr. 29; and U.S. Pat. No. 8,894,886 issued to Luhrs et al., issued 2014 Nov. 25, among others.

In other embodiments, the chemical agent comprises a hydrocarbon and a flux material. In specific embodiments the flux material is an inorganic carbonate such as $CaCO_3$. The precursor compound, hydrocarbon, and flux material are mixed and then heated to the decomposition temperature to generate the reduced metallic species. Without being bound by theory, at the decomposition temperature, the flux material, generally potassium carbonate or sodium carbonate interacts with the hydrocarbon to produce CO or another partially oxidized carbon species, $C_xO$. Other partially oxidized species such as $H_xC_yO$ may form as well. The CO, or other partially oxidized hydrocarbon species, remove oxygen from the material precursor and form $CO_2$, or other fully oxidized species.

In further embodiments, the RES mixture may additionally comprise an inert transport fluid such as water or ethanol, in order to generate a consistency of RES mixture suitable for application. In a some embodiments, a transport fluid is at least at least 5 weight percent (wt. %) of RES mixture 105, in other embodiments at least 10 wt. %, and in further embodiments at least 30 wt. %. It is further understood that RES mixture 105 may comprise additional components for purposes not specifically discussed, such as for example additional components added for control of the viscosity such that the precursor compound is compatible with the 3D printer employed, or for other purposes.

Figure 2:
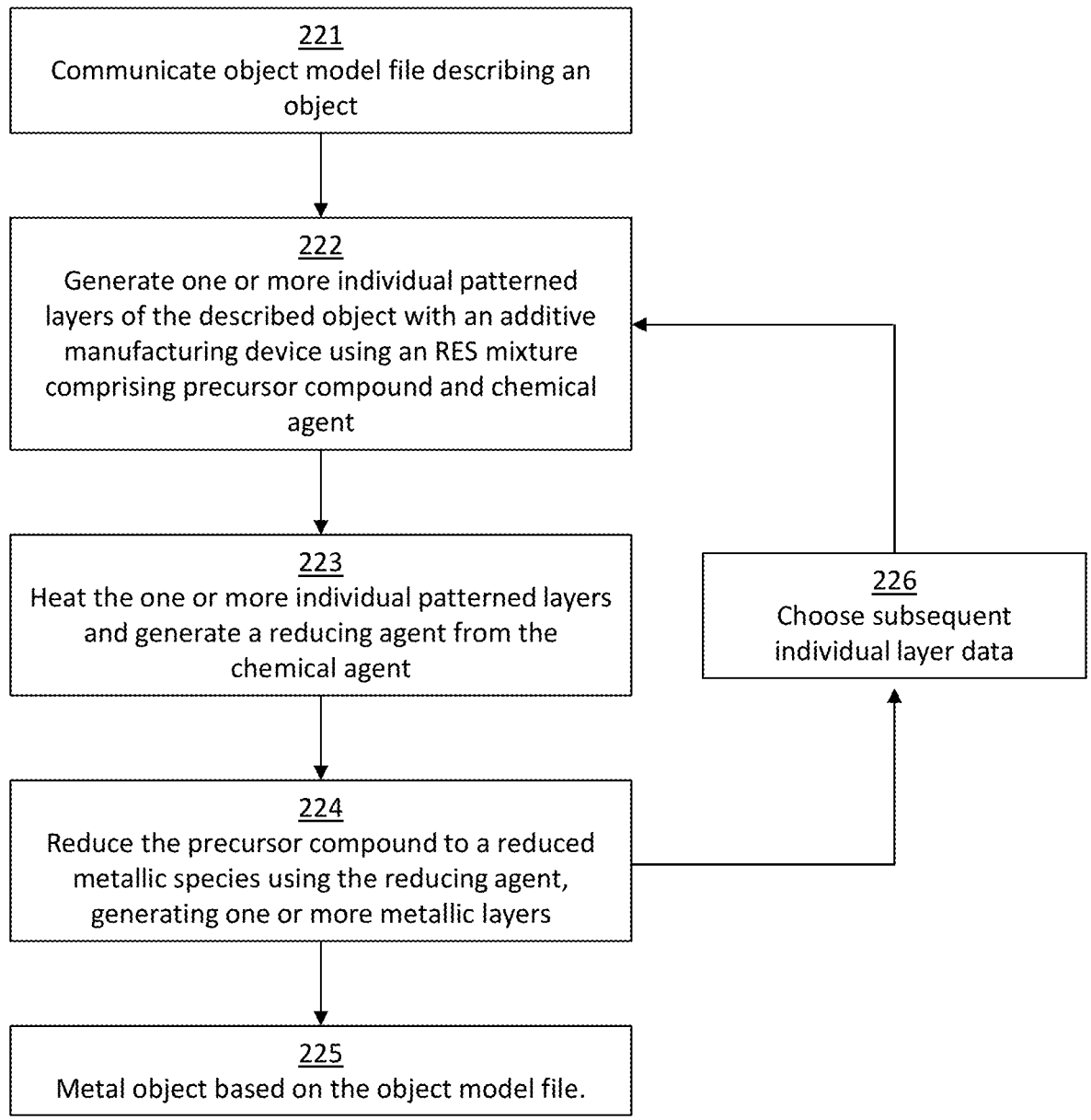
FIG. 2 illustrates a specific embodiment of the method.
Figure 3:
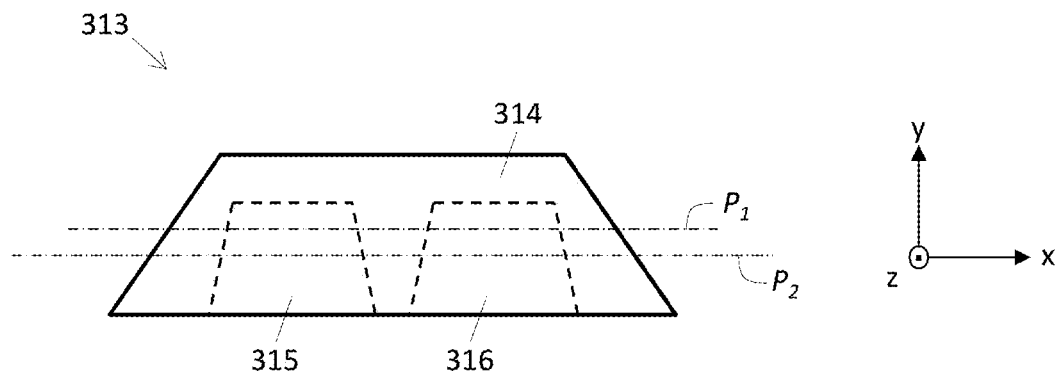
FIG. 3 illustrates an object to be reproduced using the method.
Figure 4:
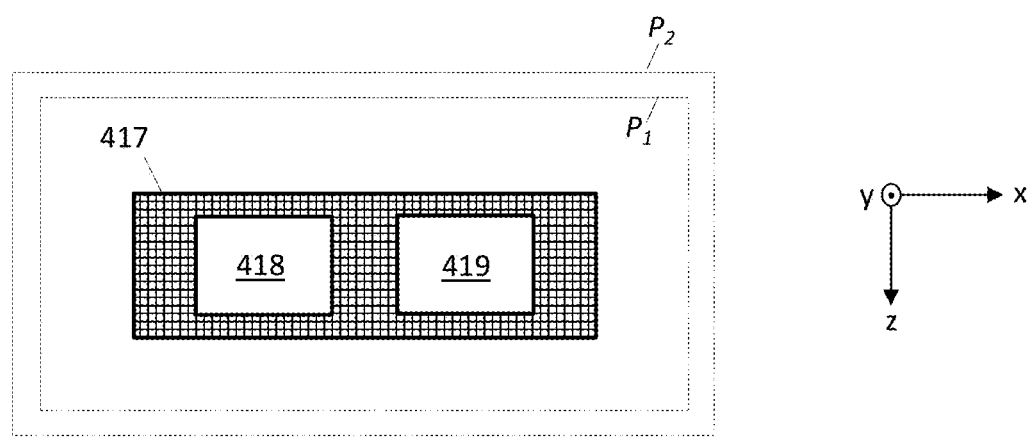
FIG. 4 illustrates individual layer data for the object.
Embodiments in accordance with the invention are further described herein with reference to the drawings.

An exemplary process and method of generating an object using low temperature metal printing is illustrated at FIG. 2. At step 221 an object model file is communicated to an additive manufacturing device comprising a printing bed and a nozzle. The object model file comprises data describing a plurality of slices of the object, with the data comprising a plurality of individual layer data and each individual layer data describing an individual pattern. The individual pattern describes one of the plurality of slices of the object. Such sliced files are known in the art. For example, FIG. 3 illustrates an object generally indicated at 313 and illustrated in accordance with the x-y-z axes shown. Object 313 comprises outer structure 314 surrounding empty volumes 315 and 316. A slice of object 313 is between section plane $P_1$ and section plane $P_2$, with $P_1$ and $P_2$ parallel to the x-z plane. An individual pattern described by individual layer data for the slice between $P_1$ and $P_2$ is illustrated at FIG. 4, illustrated in accordance with the x-y-z axes. At FIG. 4, 417 indicates that portion of the individual pattern representing the section of outer structure 314 between $P_1$ and $P_2$ while 418 and 419 represent the portion of empty volumes 315 and 316 between $P_1$ and $P_2$. The interior of 417 is either a solid fill or generated by an infill pattern, as is known in the art.

At step 222, using the additive manufacturing device, one or more individual patterned layers are generated. Each individual patterned layer is generated using specific individual layer data describing a specific individual pattern of the layer. The nozzle, or printing bed, or the nozzle and printing bed are moved in order to alter the displacement between the nozzle and the printing bed such that the nozzle reproduces the specific individual pattern of the layer. Concurrently, the RES mixture is issued from the nozzle. The nozzle and printing bed of the additive manufacturing device may be relatively displaced to generate the specific individual pattern in order manner and using any methods. In a particular embodiment, movements of the nozzle, printing bed, or nozzle and printing bed are provided or available to the additive manufacturing device in a programming language such as G-code and executed by the additive manufacturing device through operation of one or more stepper motors in mechanical communication with the nozzle, printing bed, or nozzle and printing bed.

At 223, the one or more individual patterned layers comprising the RES mixture are heated to a decomposition temperature in order to generate a reducing agent from the chemical agent. At 224, the reducing agent reduces the precursor compound and generates one or more metallic layers. During the reduction, the metal comprising the precursor compound is reduced generating a reduced metal species and subsequently interacts with other reduced metal species generated during the process to transform the one or more individual patterned layers from a general paste having little to no shear strength to an solid form exhibiting a significant shear strength. In typical embodiments, the reduced metallic species comprises at least 90 wt. % of the each generated metallic layer. The reduced metallic species generally forms solid aggregates which interlink to comprise a solidified structure while the other products of the reduction generally comprise gases which evacuate the solidified structure. In certain embodiments, forced ventilation is employed to aid in the evacuation, as well as aid in cool down of the one or more metallic layers following the heating.

In certain embodiments, the RES mixture employed has a sufficient stiffness such that a plurality of layers may be provided and the plurality of layers may be subjected to the heating as a group. In certain embodiments, every individual patterned layer is first constructed by the additive manufacturing device at step 223, such that at the conclusion of step 223 the object represented in the object model file is largely present in the form of RES mixture comprising layers, before the heating and reduction at step 224 occurs. In this embodiment, the process proceeds to step 225 where a metal object based on the object model file results. In other embodiments, step 222 generates a single patterned layer by selecting a single individual layer data from the object model file, step 223 heats the single patterned layer, and step 224 generates a single metal layer from the single patterned layer, then proceeds to step 226 where a subsequent individual layer data is selected from the object model file and steps 222-224 are repeated. This cycling methodology is employed until every individual patterned layer in the object model file has been constructed and transformed to a single metal layer before proceeding to step 225 where the metal object results.

The disclosure further provides a system for generating an object using low temperature metal printing. The system includes an additive manufacturing device which comprises a deposition apparatus having a printing bed and a nozzle, with the printing bed having an x-axis, a y-axis perpendicular to the x-axis, and a z-axis perpendicular to the x-axis and the y-axis. The additive manufacturing device further comprises one or more motors mechanically configured to displace the printing bed and/or the nozzle in a direction parallel to one or more of the x-axis, the y-axis, and the z-axis, a reservoir in fluid communication with the nozzle, the reservoir surrounding an interior volume, a Reduction-Expansion-Synthesis (RES) mixture surrounded by the interior volume comprising the reservoir, and a heating apparatus. The system further comprises a system processor comprising a memory and in data communication with the additive manufacturing device. The system processor is programmed to perform steps comprising: I) generating one or more individual patterned layers of the object by, for each individual layer comprising the one or more individual layers, performing steps comprising: retrieving a specific individual layer data describing a specific individual pattern from object model data stored in the memory, communicating the specific individual layer data to the additive manufacturing device, directing the additive manufacturing device to operate the one or more motors to alter a displacement between the printing bed and the nozzle according to the specific individual layer data while issuing the RES mixture from the RES reservoir through the nozzle; and II) producing one or more metallic layers of the object by directing the additive manufacturing device to heat the one or more individual patterned layers by of the object using the heating apparatus. In further embodiments the system processor is further programmed to perform step I) and generate a single individual patterned layer of the object, performing step II) and produce a single metal layer of the object from the single individual patterned layer of the object, and repeat these operations until all specific individual layer data comprising the object model data stored in the memory has been utilized to produce the single metal layer of the object.

Thus, provided here is a system and method of providing metal comprising objects via additive manufacturing techniques using an RES mixture. The RES process mixes a precursor compound and a chemical agent which thermally decomposes to form typically CO, $H_2$, $NH_x$, or some other reducing agent such as a hydrocarbon radical species. Using the RES mixture, an additive manufacturing device reproduces an object from a sliced object model file layer-by-layer. Heat is applied to the patterned RES mixture to thermally decompose the chemical agent and reduce the precursor compound to a reduced metal species. This heating and reduction transforms the RES mixture from a general paste having little to no shear strength to an solid form exhibiting a significant shear strength, allowing layer-by-layer generation of 3D object components. Thus, the process can be carried out using relatively simple and inexpensive 3D manufacturing equipment in conjunction with some low temperature heating apparatus such as a furnace in order to create metal-comprising objects with feature sizes of the order of 1 micron.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A additive manufacturing device for generating an object using low temperature metal printing comprising:
    a deposition apparatus comprising a printing bed and a nozzle and the printing bed comprising an x-axis, a y-axis perpendicular to the x-axis, and a z-axis perpendicular to the x-axis and the y-axis;
    one or more motors in mechanical communication with the deposition apparatus, and the one or more motors mechanically configured to displace the printing bed and the nozzle in a direction parallel to one or more of the x-axis, the y-axis, and the z-axis;
    a reservoir in fluid communication with the nozzle, the reservoir surrounding an interior volume;
    an Reduction-Expansion-Synthesis (RES) mixture surrounded by the interior volume comprised within the reservoir, the RES mixture comprising a precursor compound, a chemical agent, and an inert transport fluid, where the precursor compound comprises a metal, and where the chemical agent produces a reducing agent upon thermal decomposition, where the reducing agent comprises one or more of CO, a radical species generated from a hydrocarbon, $H_x$, and $NH_x$, where x is greater than or equal to 1, and where the inert transport fluid has a weight percent such that the precursor compound has a target viscosity that is compatible with the additive manufacturing device;
    a heating apparatus; and
    a digital processor comprising a memory, and the digital processor programmed to:
        I) access an object model file for use by the additive manufacturing device, where the object model file comprises data describing a plurality of slices of the object, and where the data comprises a plurality of individual layer data where each individual layer data describes an individual pattern and the individual pattern describes one of the plurality of slices of the object;
        II) direct the additive manufacturing device to generate one or more individual patterned layers of the object, where each individual patterned layer is generated by altering a displacement between the printing bed and the nozzle according to a specific individual layer data describing a specific individual pattern while issuing the RES mixture from the reservoir through the nozzle; and
        III) produce one or more metallic layers of the object by:
            III)A) directing the additive manufacturing device to heat the one or more individual patterned layers of the object using the heating apparatus, thereby thermally decomposing the chemical agent to produce the reducing agent; and III)B) reducing some portion of the precursor compound to a reduced metallic species by contact of the reducing agent and the precursor compound, thereby producing the one or more metallic layers of the object.

2. The additive manufacturing device of claim 1 where the digital processor is further programmed to:

IV) performing step II) and generating a single individual patterned layer of the object;

V) performing step III), step III)A), and step III)B) and producing a single metal layer of the object from the single individual patterned layer of the object; and VI) repeating step IV) and step V) until all specific individual layer data comprising the object model data stored in the memory has been utilized to produce a plurality of single metal layers of the object of step V).

3. The additive manufacturing device of claim 1 where the precursor compound comprises a metal oxide or metal hydroxide.

4. The additive manufacturing device of claim 1 where the chemical agent comprises a compound comprising $NH_z$ where z is greater than or equal to 1.

5. The additive manufacturing device of claim 1 where the chemical agent comprises a hydrocarbon and an inorganic carbonate.

6. The additive manufacturing device of claim 5 where the inorganic carbonate comprises $CaCO_3$.

7. The additive manufacturing device of claim 1 where the additive manufacturing device further comprises a gas reservoir surrounding an inert gas, and where the digital processor is further programmed to direct the additive manufacturing device to contact the one or more individual patterned layers of the object with the inert gas from the gas reservoir while heating the one or more individual patterned layers of the object using the heating apparatus.

* * * * *